United States Patent
Saleh et al.

(10) Patent No.: US 9,872,209 B1
(45) Date of Patent: Jan. 16, 2018

(54) PRE-REGISTRATION OF A WIRELESS COMMUNICATION DEVICE IN A LONG TERM EVOLUTION NETWORK

(71) Applicant: Sprint Communications Company L.P., Overland Park, KS (US)

(72) Inventors: Ahmad N. Saleh, Overland Park, KS (US); Siddharth Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 187 days.

(21) Appl. No.: 14/919,412

(22) Filed: Oct. 21, 2015

(51) Int. Cl.
| | |
|---|---|
| *H04W 60/00* | (2009.01) |
| *H04W 76/02* | (2009.01) |
| *H04W 36/00* | (2009.01) |
| *H04W 36/14* | (2009.01) |
| *H04W 88/06* | (2009.01) |

(52) U.S. Cl.
CPC ....... *H04W 36/0066* (2013.01); *H04W 36/14* (2013.01); *H04W 60/00* (2013.01); *H04W 88/06* (2013.01)

(58) Field of Classification Search
CPC ... H04W 36/0061; H04W 76/06; H04W 8/10; H04W 48/18
USPC .............................. 370/352, 338; 455/435.1
See application file for complete search history.

(56) References Cited

U.S. PATENT DOCUMENTS

| | | | |
|---|---|---|---|
| 8,064,907 B2 | 11/2011 | Gallagher et al. | |
| 8,768,351 B2 | 7/2014 | Moore et al. | |
| 8,868,087 B2 | 10/2014 | Cherian et al. | |
| 8,965,352 B2 | 2/2015 | Zhang et al. | |
| 9,001,784 B2 | 4/2015 | Ramachandran | |
| 2009/0207805 A1* | 8/2009 | Zou ........................ | H04W 60/04 370/331 |
| 2011/0149853 A1 | 6/2011 | Olsson et al. | |
| 2011/0200011 A1* | 8/2011 | Rune ................. | H04W 36/0022 370/331 |
| 2013/0039244 A1* | 2/2013 | Sun .................... | H04W 52/0235 370/311 |
| 2014/0051443 A1 | 2/2014 | Diachina et al. | |
| 2014/0269510 A1 | 9/2014 | Xu et al. | |
| 2014/0342735 A1* | 11/2014 | Liao ........................ | H04W 8/04 455/435.1 |
| 2015/0063171 A1 | 3/2015 | Bae | |
| 2015/0098391 A1 | 4/2015 | Sridhar et al. | |

(Continued)

*Primary Examiner* — Parth Patel
*Assistant Examiner* — Jason Harley (57) ABSTRACT

A data communication system pre-registers User Equipment (UE) to a Long Term Evolution (LTE) tracking area in an LTE network before the UE attaches to the LTE network. A voice communication network receives a release message for a user voice session and responsively transfers a pre-attachment message to an MME in the LTE network comprising a UE Identifier (ID), a serving base station ID, and an indication that the UE will attach to the LTE network. The MME processes the base station ID to select an LTE network Physical Cell Identity (PCI), processes the LTE network PCI to select an LTE tracking area, and pre-registers the UE ID to the selected LTE tracking area. An LTE base station receives an attachment request from the UE based on the LTE network PCI and responsively attaches the UE to the LTE network without performing a tracking area update.

20 Claims, 6 Drawing Sheets

(56) References Cited

U.S. PATENT DOCUMENTS

2015/0163701 A1 6/2015 Yenamandra et al.
2015/0230156 A1* 8/2015 Hayami ............... H04W 48/06
                                                    455/434

* cited by examiner

PRE-REGISTRATION OF A WIRELESS COMMUNICATION DEVICE IN A LONG TERM EVOLUTION NETWORK

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. Modern wireless devices contain circuitry that enables them to communicate with many different types of wireless networks using the same antenna, such as third generation (3G) Code Division Multiple Access (CDMA) networks, fourth generation (4G) long term evolution (LTE) networks, Wi-Fi local area networks, and others.

In LTE communication systems, a wireless communication device is referred to as user equipment (UE), while a wireless access node is called an enhanced node B (eNodeB). An LTE network is a high-speed data network that supports only packet switching, and thus cannot handle traditional circuit-switched voice calls. Instead, the UE typically disconnects from the LTE network and falls back to another network, such as a CDMA network. After termination of the voice call, the UE must re-register with the LTE network to resume receiving LTE data services, which involves sending a tracking area update (TAU) message to a Mobility Management Entity (MME) in the LTE network. These re-registrations introduce additional LTE Radio Access Network (RAN) signaling which can overload the LTE radio control channels and add delay in restoring LTE services.

OVERVIEW

A method of operating a data communication system to pre-register User Equipment (UE) to a Long Term Evolution (LTE) tracking area in an LTE network before the UE attaches to the LTE network is disclosed. The method comprises, in a voice communication network that is external to the LTE network, exchanging user voice data for a user voice session between the UE and a serving base station and receiving a release message for the user voice session. The method further comprises, in the voice communication network and responsive to the release message, transferring a pre-attachment message to a Mobility Management Entity (MME) in the LTE network that comprises a UE Identifier (ID), a serving base station ID, and an indication that the UE will attach to the LTE network. The method further comprises, in the MME, processing the base station ID to select an LTE network Physical Cell Identity (PCI) and transferring the LTE network PCI to the voice communication network for delivery to the UE. The method further comprises, in the MME, processing the LTE network PCI to select the LTE tracking area and pre-registering the UE ID to the LTE tracking area selected. The method further comprises, in an LTE base station, receiving an attachment request from the UE based on the LTE network PCI and responsively attaching the UE to the LTE network without performing a tracking area update. The method further comprises, in the LTE base station, transferring a page for receipt by the UE in the LTE tracking area responsive to the pre-registration of the UE ID to the LTE tracking area.

A data communication system to pre-register User Equipment (UE) to a Long Term Evolution (LTE) tracking area in an LTE network before the UE attaches to the LTE network comprises the LTE network and a voice communication network that is external to the LTE network. The LTE network comprises a Mobility Management Entity (MME) and an LTE base station. The voice communication network is configured to exchange user voice data for a user voice session between the UE and a serving base station and receive a release message for the user voice session. The voice communication network is further configured to, responsive to the release message, transfer a pre-attachment message to the MME in the LTE network that comprises a UE Identifier (ID), a serving base station ID, and an indication that the UE will attach to the LTE network. The MME is configured to process the base station ID to select an LTE network Physical Cell Identity (PCI) and transfer the LTE network PCI to the voice communication network for delivery to the UE. The MME is further configured to process the LTE network PCI to select the LTE tracking area and pre-register the UE ID to the LTE tracking area selected. The LTE base station is configured to receive an attachment request from the UE based on the LTE network PCI and responsively attach the UE to the LTE network without performing a tracking area update. The LTE base station is further configured to transfer a page for receipt by the UE in the LTE tracking area responsive to the pre-registration of the UE ID to the LTE tracking area.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
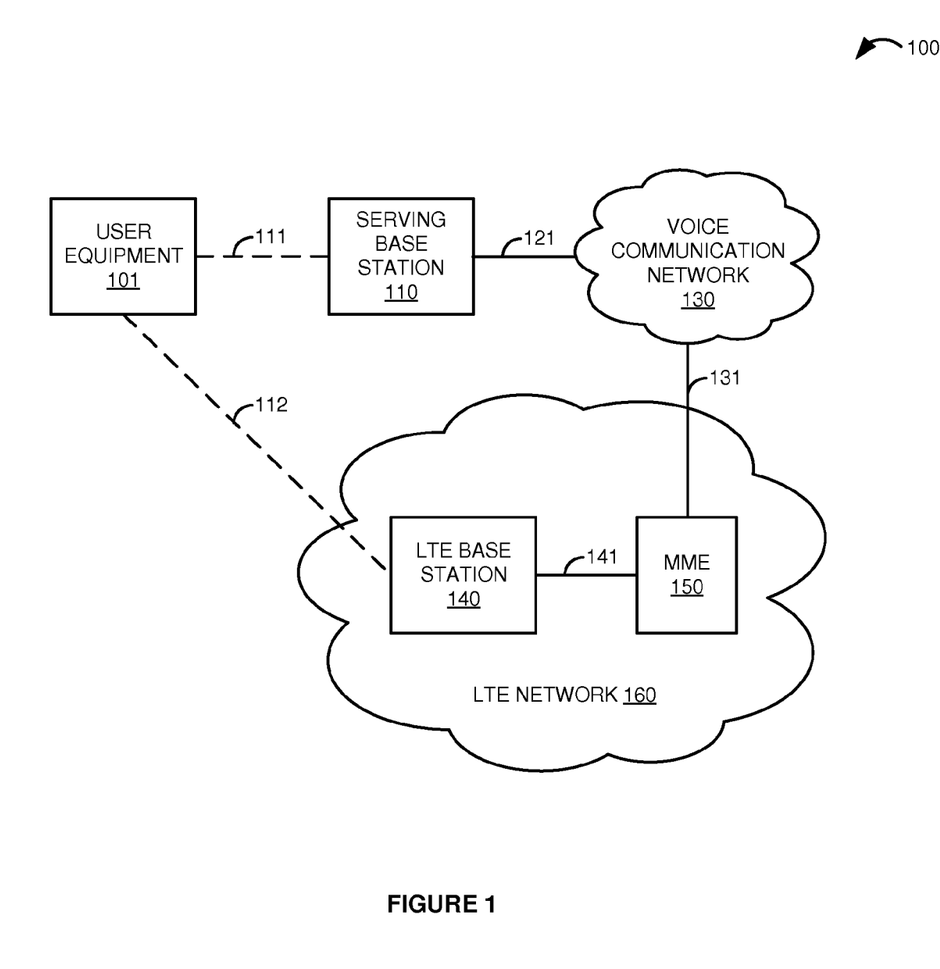
FIG. 1 is a block diagram that illustrates a data communication system.

FIG. 1 is a block diagram that illustrates data communication system 100. Data communication system 100 includes user equipment (UE) device 101, serving base station 110, voice communication network 130, and Long Term Evolution (LTE) network 160. UE 101 and serving base station 110 are in communication over wireless communication link 111. Serving base station 110 and voice communication network 130 communicate over communication link 121. LTE network 160 includes LTE base station 140 and Mobility Management Entity (MME) 150. Voice communication network 130 and MME 150 communicate over communication link 131. LTE base station 140 and MME 150 are in communication over communication link 141. UE 101 and LTE base station 140 may communicate over wireless communication link 112.

Figure 2:
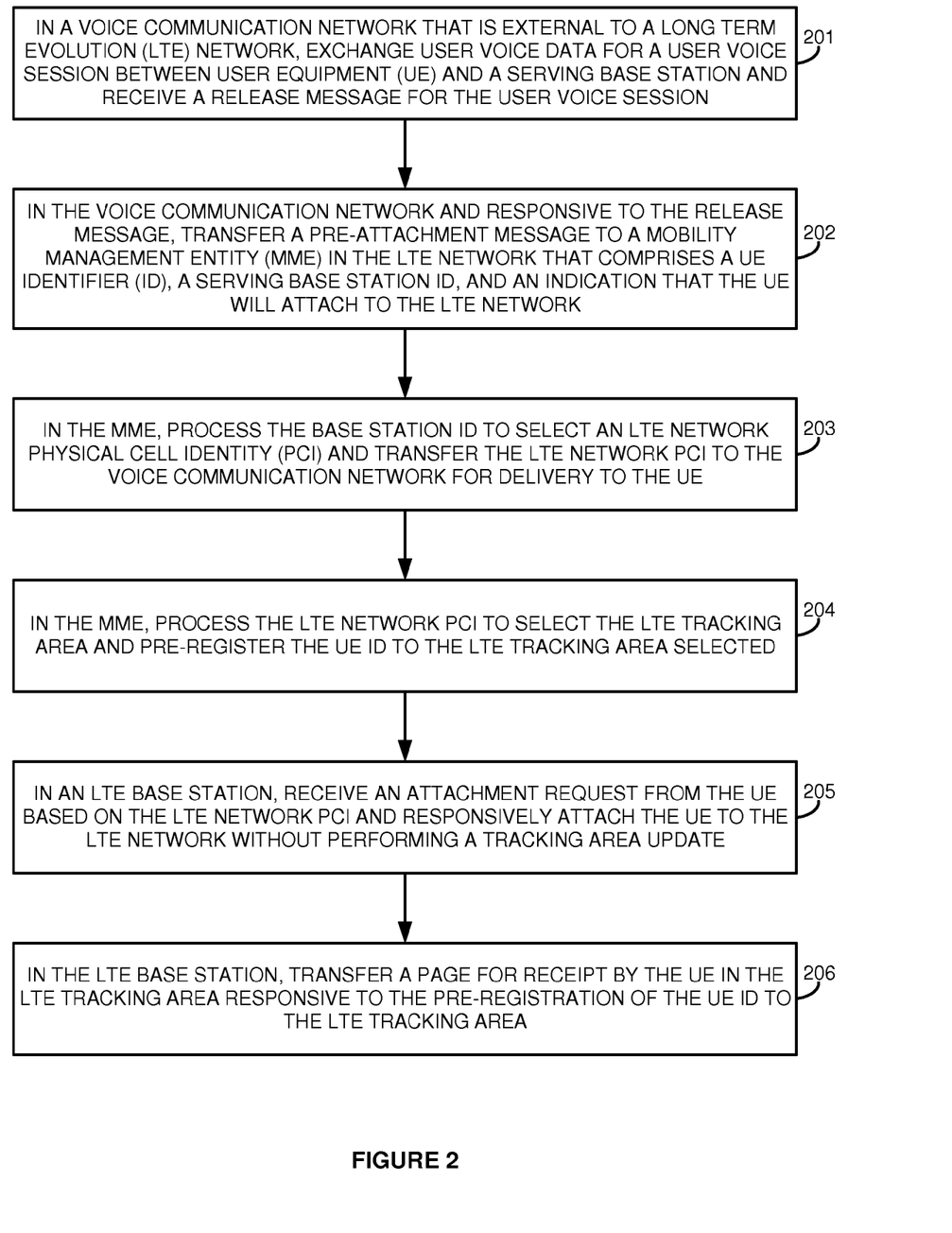
FIG. 2 is a flow diagram that illustrates an operation of the data communication system.

FIG. 2 is a flow diagram that illustrates an operation of data communication system 100. The steps of the operation are indicated below parenthetically. The operation of data communication system 100 shown in FIG. 2 may be employed to pre-register UE 101 to an LTE tracking area in LTE network 160 before UE 101 attaches to LTE network 160.

As shown in the operational flow of FIG. 2, voice communication network 130, which is external to LTE network 160, exchanges user voice data for a user voice session between UE 101 and serving base station 110 and receives a release message for the user voice session (201). The user voice data comprises audio data for the user voice session or voice call between UE 101 and some other communication device (not shown). In some examples, voice communication network 130 could comprise a Code Division Multiple Access (CDMA) wireless network, a Global System for Mobile Communications (GSM) wireless network, a Circuit Switched FallBack (CSFB) network, a wireless local area network (WLAN) such as IEEE 802.11 (Wi-Fi), or any other type of communication network, including combinations thereof. Since voice communication network 130 could comprise various different types of networks, the user voice session could comprise any communication format or protocol that may be utilized by those networks. The release message for the user voice session received by voice communication network 130 indicates that the user voice session has terminated. Voice communication network 130 would typically receive the release message for the user voice session from serving base station 110 if UE 101 hangs up or otherwise ends the call, but in other cases, voice communication network 130 could receive the release message from other systems, networks, or devices in some examples.

Responsive to the release message, voice communication network 130 transfers a pre-attachment message to MME 150 in LTE network 160 that comprises a UE Identifier (ID), a serving base station ID, and an indication that UE 101 will attach to LTE network 160 (202). In some examples, the UE ID could comprise a Mobile Station International Subscriber Directory Number (MSISDN) or some other telephone number, Electronic Serial Number (ESN), Mobile Equipment Identifier (MEID), International Mobile Equipment Identity (IMEI), Media Access Control Identifier (MACID), or some other identifier that uniquely identifies UE 101—including combinations thereof. The serving base station ID comprises any information that may be used to identify serving base station 110, such as a Physical Cell Identity (PCI), Public Land Mobile Network (PLMN) identifier, or some other identifier of base station 110. The indication that UE 101 will attach to LTE network 160 included in the pre-attachment message comprises any information that informs MME 150 that UE 101 will request an attachment to LTE network 160.

MME 150 processes the base station ID to select an LTE network Physical Cell Identity (PCI) and transfers the LTE network PCI to voice communication network 130 for delivery to UE 101 (203). In some examples, MME 150 could process the base station ID to select the LTE network PCI by referring to a lookup table that relates base station IDs of base stations in voice communication network 130 to identifiers of LTE base stations in LTE network 160, which would typically be associated based on proximity. In this example, MME 150 processes the base station ID of base station 110 to select the corresponding LTE network PCI associated with LTE base station 140 and transfers the LTE network PCI to voice communication network 130. In addition to selecting the LTE network PCI, in some implementations MME 150 could process the base station ID to select an LTE channel ID and transfer the LTE channel ID to voice communication network 130 for delivery to UE 101. Voice communication network 130 would thus receive the LTE network PCI and/or the LTE channel ID from MME 150 and transfer the LTE network PCI and/or the LTE channel ID to UE 101. In some examples, voice communication network 130 could also transfer another release message for the user voice session to UE 101 after transferring the LTE network PCI and/or the LTE channel ID to UE 101.

MME 150 processes the LTE network PCI to select an LTE tracking area and pre-registers the UE ID to the LTE tracking area selected (204). Since UE 101 is about to attach to LTE network 160, MME 150 uses the LTE network PCI to register UE 101 as specified by the UE ID to the tracking area associated with the LTE network PCI. As discussed above, MME 150 has already transferred the LTE network PCI to voice communication network 130 for delivery to UE 101, thereby ensuring that UE 101 is informed of the selected LTE network PCI that identifies LTE base station 140 selected by MME 150 for attachment.

LTE base station 140 receives an attachment request from UE 101 based on the LTE network PCI and responsively attaches UE 101 to LTE network 160 without performing a tracking area update (205). Typically, in response to receiving the LTE network PCI, UE 101 would transfer the attachment request to LTE base station 140 based on the LTE network PCI. In some implementations, receiving the attachment request from UE 101 into LTE base station 140 could further comprise receiving the attachment request based on the LTE channel ID. Upon receipt of the attachment request, LTE base station 140 responsively attaches UE 101 to LTE network 160. Since MME 150 has already pre-registered UE 101 to the selected LTE tracking area in LTE network 160, it is unnecessary for UE 101 to send a tracking area update message to MME 150 to register on LTE network 160.

LTE base station 140 transfers a page for receipt by UE 101 in the LTE tracking area responsive to the pre-registration of the UE ID to the LTE tracking area (206). After MME 150 pre-registers the UE ID of UE 101 to the selected LTE tracking area in LTE network 160, LTE base station 140 responsively pages UE 101 in the LTE tracking area. In some implementations, LTE base station 140 would then communicate with MME 150 using S1 Application Protocol (S1AP) signaling messages to authenticate UE 101 and establish an LTE data session.

Advantageously, UE 101 is able to attach to LTE network 160 after termination of a voice session on voice communication network 130 without having to send a tracking area update message to MME 150. Because MME 150 pre-registers the UE ID of UE 101 to the selected LTE tracking area, it is unnecessary for UE 101 and LTE base station 140 to perform several of the steps typically required for registration on LTE network 160, thereby reducing LTE Radio Access Network (RAN) signaling. In this manner, the time latency for UE 101 to receive LTE services after termination of a voice session is greatly reduced, resulting in an improved user experience.

Now referring back to FIG. 1, User Equipment (UE) 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. UE 101 may also include a user interface, memory system, software, processing circuitry, or some other communication components. For example, UE 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by UE 101 include Code Division Multiple Access (CDMA) 1 times Radio Transmission Technology (1×RTT), Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between UE 101 and a base station.

Serving base station 110 comprises RF communication circuitry and an antenna. The RF communication circuitry typically includes an amplifier, filter, RF modulator, and signal processing circuitry. Serving base station 110 may also comprise a router, server, memory device, software, processing circuitry, cabling, power supply, network communication interface, structural support, or some other communication apparatus. Serving base station 110 could comprise a wireless access node, Internet access node, telephony service node, wireless data access point, or some other wireless communication system—including combinations thereof. Some examples of serving base station 110 include a base transceiver station (BTS), base station controller (BSC), radio base station (RBS), Node B, and others—including combinations thereof. Wireless network protocols that may be utilized by serving base station 110 include CDMA, GSM, UMTS, HSPA, EV-DO, EV-DO rev. A, B, and C, WiMAX, Wi-Fi, Bluetooth, Internet, telephony, or some other communication format—including combinations thereof.

Voice communication network 130 comprises the core network of a wireless communication service provider, and could include routers, gateways, telecommunication switches, servers, processing systems, or other communication equipment and systems for providing communication and data services. Voice communication network 130 could comprise wireless communication nodes, telephony switches, Internet routers, network gateways, computer systems, communication links, or some other type of communication equipment—including combinations thereof. Voice communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Voice communication network 130 may be configured to communicate over metallic, wireless, or optical links—including combinations thereof. Voice communication network 130 may be configured to use time-division multiplexing (TDM), Internet Protocol (IP), Ethernet, optical networking, wireless protocols, communication signaling, or some other communication format—including combinations thereof. In some examples, voice communication network 130 includes further access nodes and associated equipment for providing communication services to many wireless communication devices across a large geographic region.

LTE base station 140 comprises RF communication circuitry and an antenna. The RF communication circuitry typically includes an amplifier, filter, RF modulator, and signal processing circuitry. LTE base station 140 may also comprise a router, server, memory device, software, processing circuitry, cabling, power supply, network communication interface, structural support, or some other communication apparatus. LTE base station 140 could comprise a wireless access node, Internet access node, telephony service node, wireless data access point, or some other wireless communication system—including combinations thereof. In some examples, LTE base station 140 could comprise an enhanced Node B (eNodeB). Wireless network protocols that may be utilized by LTE base station 140 include 3GPP LTE, LTE Advanced, Wi-Fi, Bluetooth, Internet, telephony, or some other communication format—including combinations thereof.

Mobility management entity 150 comprises a processing system and communication transceiver. Mobility management entity 150 may also include other components such as a router, server, data storage system, and power supply. Mobility management entity 150 may reside in a single device or may be distributed across multiple devices. Mobility management entity 150 may be a discrete system or may be integrated within other systems—including other systems within data communication system 100. In some examples, mobility management entity 150 could comprise a computing system, control plane function, paging system, control node, device management system, database system, session initiation protocol (SIP) server, authentication, authorization, and accounting (AAA) server, home agent, packet data serving node (PDSN), network switch, mobile switching center, router, switching system, packet gateway, network gateway system, Internet access node, application server, service node, firewall, or some other communication system—including combinations thereof.

LTE network 160 comprises the core network of a wireless communication service provider, and could include routers, gateways, telecommunication switches, servers, processing systems, or other communication equipment and systems for providing communication and data services. LTE network 160 could comprise wireless communication nodes, telephony switches, Internet routers, network gateways, computer systems, communication links, or some other type of communication equipment—including combinations thereof. LTE network 160 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. LTE network 160 may be configured to communicate over metallic, wireless, or optical links—including combinations thereof. LTE network 160 may be configured to use time-division multiplexing (TDM), Internet Protocol (IP), Ethernet, optical networking, wireless protocols, communication signaling, or some other communication format—including combinations thereof. In some examples, LTE network 160 includes further access nodes and associated equipment for providing communication services to many wireless communication devices across a large geographic region.

Wireless communication links 111 and 112 use the air or space as the transport medium. Wireless communication links 111 and 112 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111 and 112 may comprise many different signals sharing the same link. For example, wireless communication links 111 and 112 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, and 141 use metal, air, space, optical fiber such as glass or plastic, or some other material as the transport medium—including combinations thereof. Communication links 121, 131, and 141 could use various communication protocols, such as TDM, IP, Ethernet, telephony, optical networking, hybrid fiber coax (HFC), communication signaling, wireless protocols, or some other communication format—including combinations thereof. Communication links 121, 131, and 141 may be a direct links or could include intermediate networks, systems, or devices.

Figure 3:
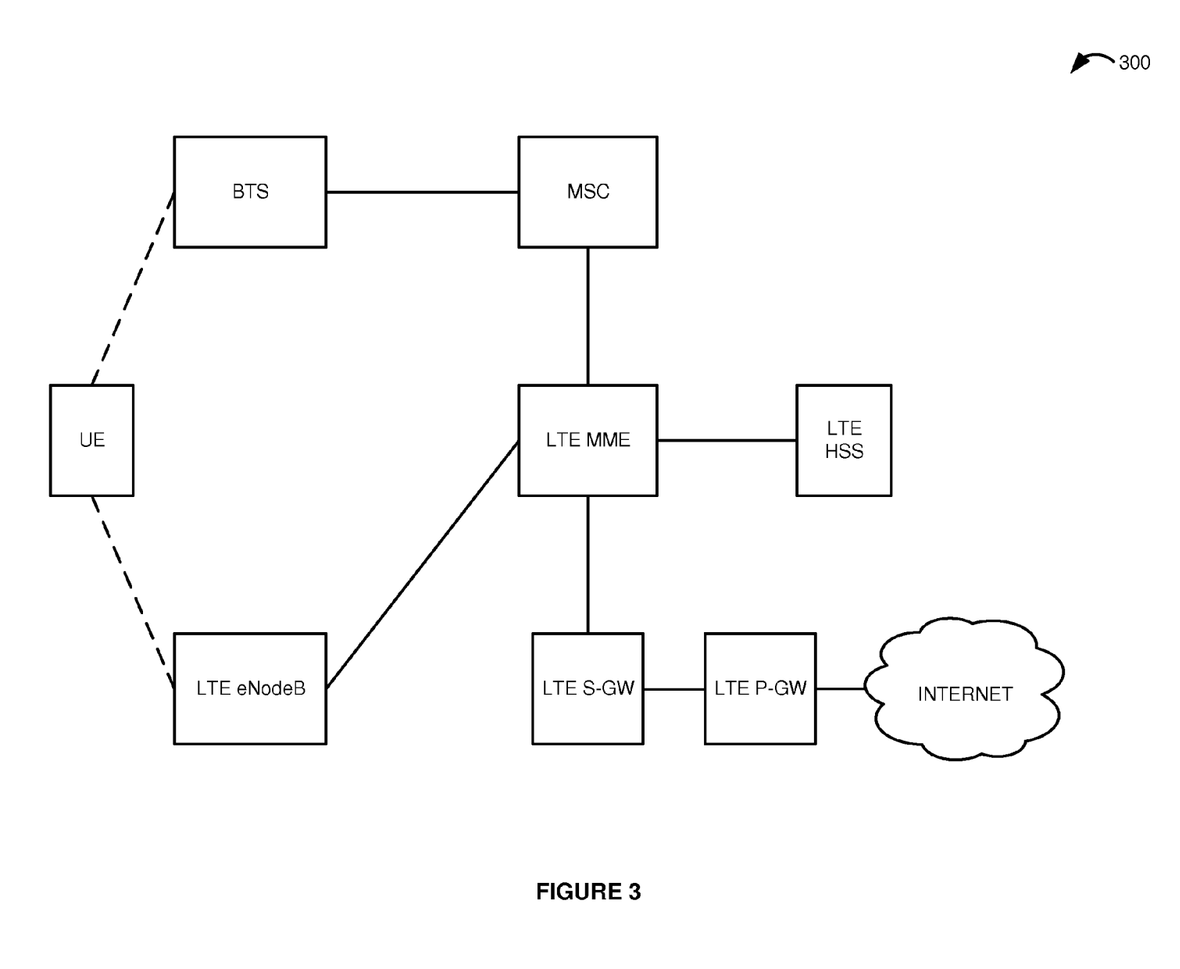
FIG. 3 is a block diagram that illustrates a communication system in an exemplary embodiment.

FIG. 3 is a block diagram that illustrates communication system 300 in an exemplary embodiment. Communication system 300 includes elements of both a CDMA 1×RTT communication network and an LTE data network. The CDMA 1×RTT network includes a base transceiver station (BTS) and a mobile switching center (MSC). The BTS provides an example of serving base station 110, although base station 110 may use alternative configurations. The LTE network includes an LTE enhanced Node B (eNodeB) base station that is in communication with network elements of the LTE network. The LTE eNodeB provides an example of LTE base station 140, although base station 140 may use alternative configurations. The LTE network in this example includes a mobility management entity (MME), serving gateway (S-GW), packet data network gateway (P-GW), home subscriber server (HSS), and other network elements typically found in an LTE network that are not shown for clarity. Communication system 300 also includes a user equipment (UE) device. The UE in this example comprises an enhanced circuit-switch fallback (eCSFB) UE dual-mode device that is capable of communicating with both the CDMA BTS and the LTE eNodeB. The LTE network is a high-speed data network that supports only packet switching, and thus traditional circuit-switched voice calls are still handled by the CDMA 1×RTT communication network.

In operation, when the UE is first powered up, it registers and attaches to the LTE network first, and will then pre-register with the CDMA network over an S102 signaling link. Once attached to the LTE network, the UE will receive 1×RTT Page Requests for voice calls via the LTE network, and will subsequently be directed to the CDMA 1×RTT network to handle voice services. Thus, when the eCSFB UE receives a 1×RTT voice service request, it will disconnect from the LTE eNodeB and fall back to the CDMA network to handle the voice call via the BTS and MSC. As soon as the call ends, LTE re-registration is traditionally required, which introduces additional LTE RAN signaling and added delay in restoring LTE data services to the user. A detailed description of how these drawbacks can be avoided by pre-registering the UE on the LTE network after CDMA voice call termination will now be discussed with respect to FIG. 4.

Figure 4:
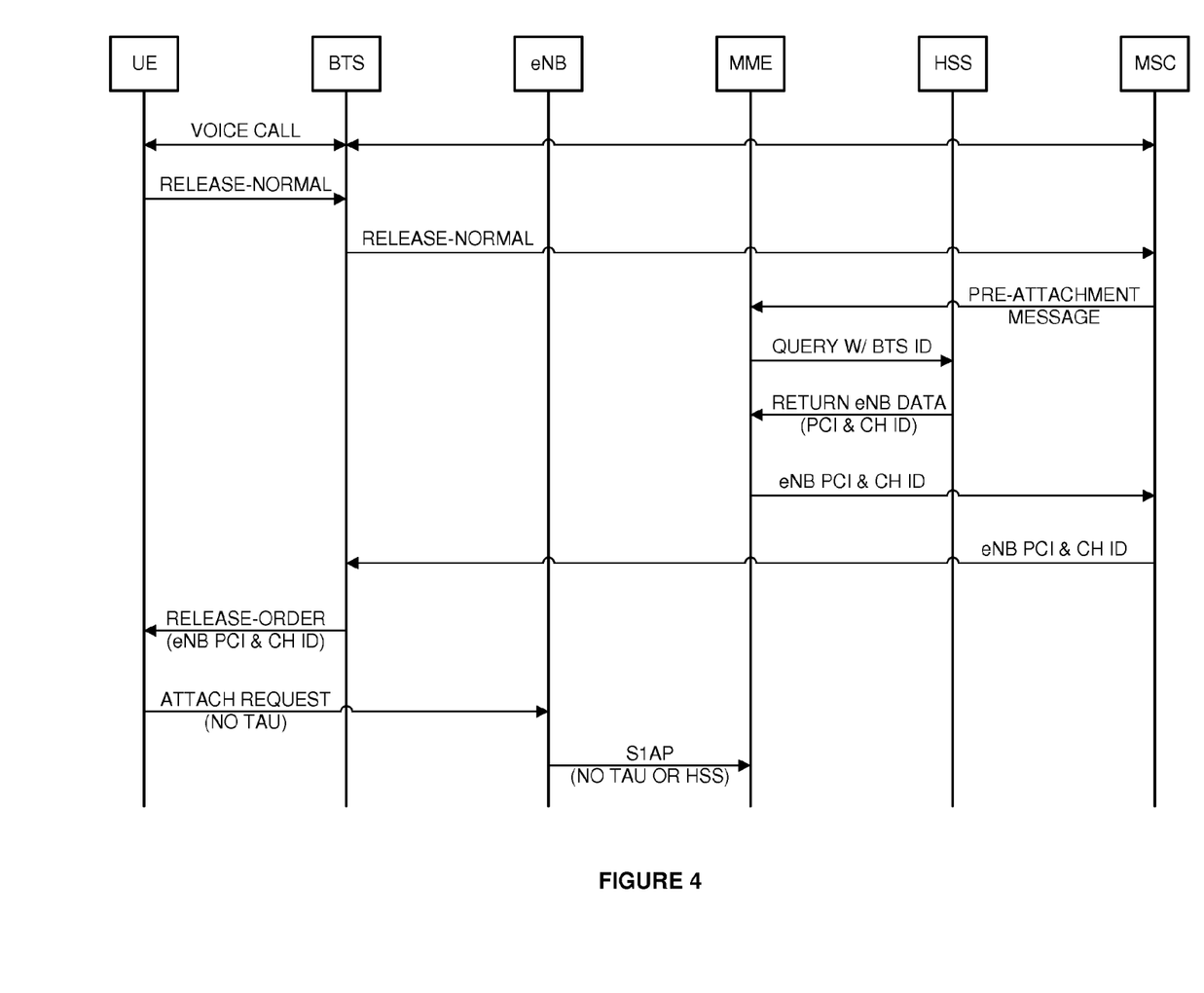
FIG. 4 is a sequence diagram that illustrates an operation of a communication system in an exemplary embodiment.

FIG. 4 is a sequence diagram that illustrates an operation of communication system 300 in an exemplary embodiment. Initially, the UE is engaged in a circuit-switched voice call on the CDMA 1×RTT network, exchanging voice data between the BTS and the MSC. When the user terminates the voice call, the UE sends a 'Release-Normal' message to the BTS. When the BTS receives a 'Release-Normal' message, it traditionally responds by sending a 'Release-Order' message back to the UE. However, in this exemplary operation, instead of transferring a 'Release-Order' message to the UE immediately, the BTS holds its response, and forwards the 'Release-Normal' in a new message to the MSC.

When the MSC receives the 'Release-Normal' message from the BTS, it responsively informs the LTE MME of an identifier of the CDMA BTS to which the UE is attached. This is achieved by the BTS transferring a pre-attachment message to the MME. The pre-attachment message comprises the UE ID, BTS ID, and an indication that the UE will attach to the LTE network. Upon receipt of the pre-attachment message, the MME queries the HSS with the BTS ID to determine its corresponding LTE eNodeB ID. In some examples, this may be achieved through use of an eNodeB/Reference_Cell_ID table that maps the reference cell IDs of CDMA base stations to corresponding eNodeB cell IDs of the closest eNodeB base stations in the LTE network. Based on the retrieved eNodeB PCI, the corresponding eNodeB is then checked for load across the various bands and channels it supports and the channel ID of the best channel for attachment by the UE is provided back to the MME. Since the UE is about to return to the LTE network, the MME registers the UE to the LTE network based on the UE ID received in the pre-attachment message. The MME then informs the MSC of the eNodeB PCI and channel ID determined for the UE.

While the UE is still attached to the CDMA network, the MSC sends the eNodeB PCI with the channel ID to the BTS. Once the BTS receives this information from the MSC, the BTS sends a new updated 'Release-Order' message to the UE that includes the eNodeB PCI and the channel ID received from the MSC. The UE uses the data in the 'Release-Order' message to update its information and attach to the LTE network. Since the UE is already registered on the MME, the UE sends an attach request to the eNodeB. Importantly, the UE does not have to send a new tracking area update (TAU) to the MME in order to re-register with the LTE network, because the UE is already registered at the MME and the appropriate eNodeB is already known. In response to the attach request from the UE, the eNodeB communicates with the MME using the S1 Application Protocol (S1AP), and further communication with the HSS is not required. LTE network access is thus restored for the UE, and the user can resume engaging in an Internet data session via the LTE data network. Beneficially, this technique avoids the extra LTE RAN signaling typically needed for UE LTE re-registration and reduces the time latency needed for the user to receive LTE services after a 1×RTT voice call, thereby improving the user experience.

Figure 5:
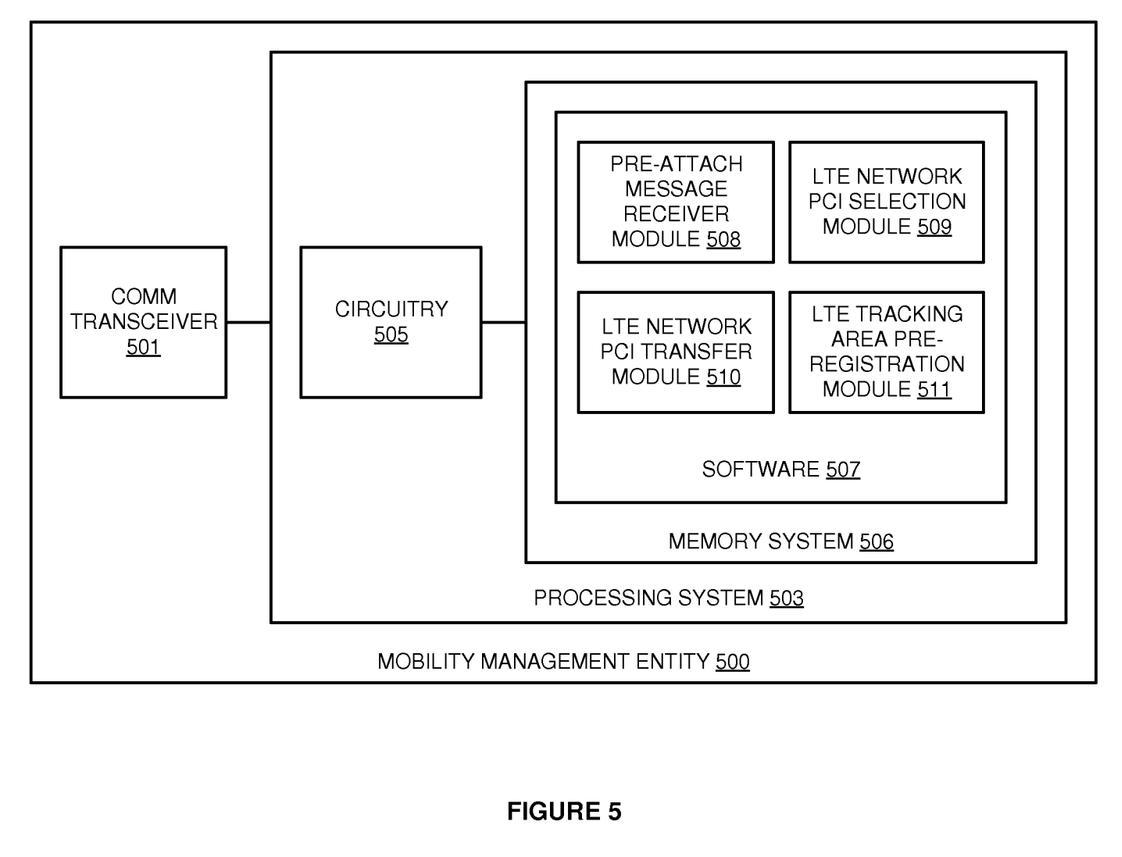
FIG. 5 is a block diagram that illustrates a mobility management entity.

FIG. 5 is a block diagram that illustrates mobility management entity 500. Mobility management entity 500 provides an example of MME 150, although MME 150 may use alternative configurations. Mobility management entity 500 comprises communication transceiver 501 and processing system 503. Processing system 503 is linked to communication transceiver 501. Processing system 503 includes processing circuitry 505 and memory device 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof. Communication transceiver 501 could be configured to receive a pre-attachment message that comprises a UE Identifier (ID), a serving base station ID, and an indication that a UE will attach to an LTE network. Communication transceiver 501 could also be configured to transfer an LTE network PCI to a voice communication network for delivery to a UE.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. In some examples, a computer apparatus could comprise memory system 506 and operating software 507. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for mobility management entity 150. In particular, operating software 507 may direct processing system 503 to direct communication transceiver 501 to receive a pre-attachment message that comprises a UE ID, a serving base station ID, and an indication that a UE will attach to an LTE network. Operating software 507 further directs processing system 503 to process the base station ID to select an LTE network Physical Cell Identity (PCI). Operating software 507 also directs processing system 503 to direct communication transceiver 501 to transfer the LTE network PCI to a voice communication network for delivery to the UE. Finally, operating software 507 directs processing system 503 to process the LTE network PCI to select an LTE tracking area and pre-register the UE ID to the LTE tracking area selected.

In some examples, operating software 507 could comprise pre-attachment message receiver software module 508 that receives a pre-attachment message that comprises a UE ID, a serving base station ID, and an indication that a UE will attach to an LTE network. Additionally, operating software 507 could comprise an LTE network PCI selection software module 509 that processes the base station ID to select an LTE network Physical Cell Identity (PCI). Further, operating software 507 could comprise an LTE network PCI transfer software module 510 that transfers the LTE network PCI to a voice communication network for delivery to the UE. Finally, operating software 507 could comprise an LTE tracking area pre-registration software module 511 that processes the LTE network PCI to select an LTE tracking area and pre-registers the UE ID to the LTE tracking area selected.

Figure 6:
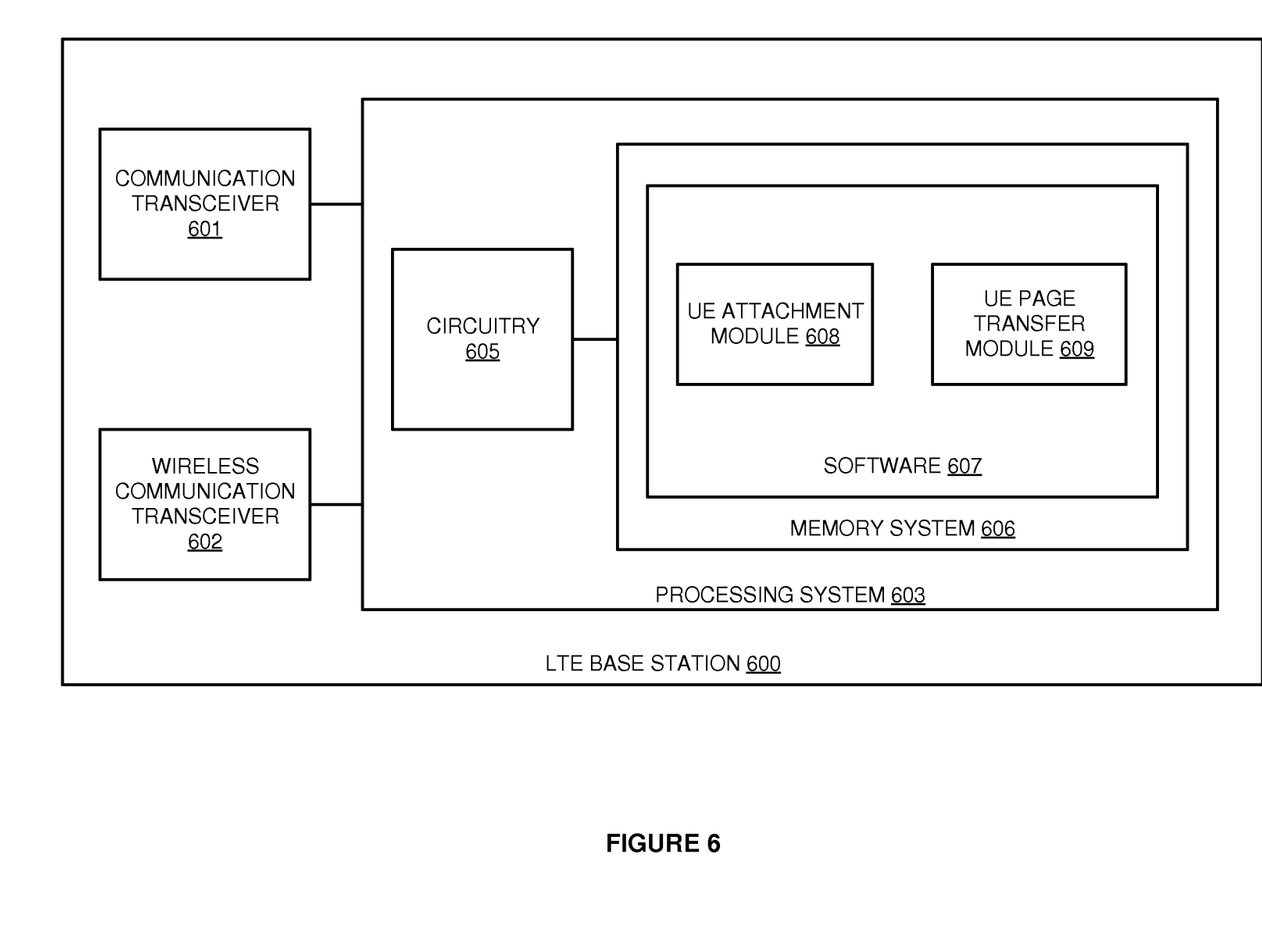
FIG. 6 is a block diagram that illustrates a Long Term Evolution base station.

FIG. 6 is a block diagram that illustrates LTE base station 600. LTE base station 600 provides an example of LTE base station 140, although base station 140 may have alternative configurations. Wireless access node 600 comprises communication transceiver 601, wireless communication transceiver 602, and processing system 603. Processing system 603 is linked to communication transceiver 601 and wireless communication transceiver 602. Processing system 603 includes processing circuitry 605 and memory system 606 that stores operating software 607. Operating software 607 comprises software modules 608 and 609.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof.

Wireless communication transceiver 602 comprises RF communication circuitry and an antenna. The RF communication circuitry typically includes an amplifier, filter, RF modulator, and signal processing circuitry. Wireless communication transceiver 602 may also include a memory system, software, processing circuitry, or some other communication device. Wireless communication transceiver 602 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format. Wireless communication transceiver 602 may be configured to receive an attachment request from a UE. Wireless communication transceiver 602 may also be configured to transfer a page for receipt by the UE in an LTE tracking area responsive to a pre-registration of the UE ID to the LTE tracking area.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. In some examples, a computer apparatus could comprise memory system 606 and operating software 607. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608 and 609, although software 607 could have alternative configurations in other examples.

When executed by circuitry 605, operating software 607 directs processing system 603 to operate as described herein for LTE base station 140. In particular, operating software 607 may direct processing system 603 to direct wireless communication transceiver 602 to receive an attachment request from a UE based on an LTE network PCI. Operating software 607 further directs processing system 603 to attach the UE to the LTE network without performing a tracking area update responsive to the attachment request from the UE. In addition, operating software 607 directs processing system 603 to direct wireless communication transceiver 602 to transfer a page for receipt by the UE in an LTE tracking area responsive to a pre-registration of the UE ID to the LTE tracking area.

In this example, operating software 607 comprises a UE attachment software module 608 that receives an attachment request from the UE based on the LTE network PCI and responsively attaches the UE to the LTE network without performing a tracking area update. Operating software 607 further comprises a UE page transfer software module 609 that transfers a page for receipt by the UE in an LTE tracking area responsive to a pre-registration of the UE ID to the LTE tracking area.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication system to pre-register User Equipment (UE) to a Long Term Evolution (LTE) tracking area in an LTE network before the UE attaches to the LTE network; the method comprising:
    in a voice communication network that is external to the LTE network, exchanging user voice data for a user voice session between the UE and a serving base station and receiving a release message for the user voice session;
    in the voice communication network and responsive to the release message, transferring a pre-attachment message to a Mobility Management Entity (MME) in the LTE network that comprises a UE Identifier (ID), a serving base station ID, and an indication that the UE will attach to the LTE network;
    in the MME, processing the base station ID to select an LTE network Physical Cell Identity (PCI) and transferring the LTE network PCI to the voice communication network for delivery to the UE;
    in the MME, processing the LTE network PCI to select the LTE tracking area and pre-registering the UE ID to the LTE tracking area selected;
    in an LTE base station, receiving an attachment request from the UE based on the LTE network PCI and responsively attaching the UE to the LTE network without performing a tracking area update; and
    in the LTE base station, transferring a page for receipt by the UE in the LTE tracking area responsive to the pre-registration of the UE ID to the LTE tracking area.

2. The method of claim 1 further comprising, in the voice communication network, receiving the LTE network PCI from the MME and transferring the LTE network PCI to the UE.

3. The method of claim 2 further comprising, in the voice communication network, transferring another release message for the user voice session to the UE after transferring the LTE network PCI to the UE.

4. The method of claim 1 further comprising, in the MME, processing the base station ID to select an LTE channel ID and transferring the LTE channel ID to the voice communication network for delivery to the UE, and wherein receiving the attachment request from the UE into the LTE base station further comprises receiving the attachment request based on the LTE channel ID.

5. The method of claim 4 further comprising, in the voice communication network, receiving the LTE channel ID from the MME and transferring the LTE channel ID to the UE.

6. The method of claim 5 further comprising, in the voice communication network, transferring another release message for the user voice session to the UE after transferring the LTE channel ID to the UE.

7. The method of claim 1 wherein the voice communication network comprises a Code Division Multiple Access (CDMA) wireless network.

8. The method of claim 1 wherein the voice communication network comprises a Global System for Mobile Communications (GSM) wireless network.

9. The method of claim 1 wherein the voice communication network comprises a Circuit Switched FallBack (CSFB) network.

10. The method of claim 1 wherein the voice communication network comprises a wireless local area network (WLAN).

11. A data communication system to pre-register User Equipment (UE) to a Long Term Evolution (LTE) tracking area in an LTE network before the UE attaches to the LTE network; the data communication system comprising:
    the LTE network and a voice communication network that is external to the LTE network, the LTE network comprising a Mobility Management Entity (MME) and an LTE base station;
    the voice communication network configured to exchange user voice data for a user voice session between the UE and a serving base station and receive a release message for the user voice session;
    the voice communication network configured to, responsive to the release message, transfer a pre-attachment message to the MME in the LTE network that comprises a UE Identifier (ID), a serving base station ID, and an indication that the UE will attach to the LTE network;
    the MME configured to process the base station ID to select an LTE network Physical Cell Identity (PCI) and transfer the LTE network PCI to the voice communication network for delivery to the UE;
    the MME configured to process the LTE network PCI to select the LTE tracking area and pre-register the UE ID to the LTE tracking area selected;
    the LTE base station configured to receive an attachment request from the UE based on the LTE network PCI and responsively attach the UE to the LTE network without performing a tracking area update; and
    the LTE base station configured to transfer a page for receipt by the UE in the LTE tracking area responsive to the pre-registration of the UE ID to the LTE tracking area.

12. The data communication system of claim 11 further comprising the voice communication network configured to receive the LTE network PCI from the MME and transfer the LTE network PCI to the UE.

13. The data communication system of claim 12 further comprising the voice communication network configured to transfer another release message for the user voice session to the UE after transferring the LTE network PCI to the UE.

14. The data communication system of claim 11 further comprising the MME configured to process the base station ID to select an LTE channel ID and transfer the LTE channel ID to the voice communication network for delivery to the UE, and wherein the base station configured to receive the attachment request from the UE comprises the base station configured to receive the attachment request based on the LTE channel ID.

15. The data communication system of claim 14 further comprising the voice communication network configured to receive the LTE channel ID from the MME and transfer the LTE channel ID to the UE.

16. The data communication system of claim 15 further comprising the voice communication network configured to transfer another release message for the user voice session to the UE after transferring the LTE channel ID to the UE.

17. The data communication system of claim 11 wherein the voice communication network comprises a Code Division Multiple Access (CDMA) wireless network.

18. The data communication system of claim 11 wherein the voice communication network comprises a Global System for Mobile Communications (GSM) wireless network.

19. The data communication system of claim 11 wherein the voice communication network comprises a Circuit Switched FallBack (CSFB) network.

20. The data communication system of claim 11 wherein the voice communication network comprises a wireless local area network (WLAN).

* * * * *